US007221070B2

(12) United States Patent
Oba et al.

(10) Patent No.: US 7,221,070 B2

(45) Date of Patent: May 22, 2007

(54) ELECTRIC APPLIANCE WITH TERMINAL

(75) Inventors: Takeharu Oba, Toyohashi (JP); Kouji Shibata, Toyohashi (JP); Yoshihiro Ikebe, Kosai (JP); Kenji Obata, Kosai (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 0 days.

(21) Appl. No.: 11/110,843

(22) Filed: Apr. 21, 2005

(65) Prior Publication Data

US 2005/0239346 A1 Oct. 27, 2005

(30) Foreign Application Priority Data

Apr. 27, 2004 (JP) ............................ 2004-131705

(51) Int. Cl.
*H02K 11/00* (2006.01)

(52) U.S. Cl. .......................................... 310/71; 310/51

(58) Field of Classification Search .................. 310/51, 310/71, 89, 239; 439/62, 83, 874

See application file for complete search history.

(56) References Cited

U.S. PATENT DOCUMENTS 5,104,324 A * 4/1992 Grabbe et al. .............. 439/962
5,661,352 A * 8/1997 Oguchi et al. ................ 310/71
6,388,358 B1 * 5/2002 Umeda et al. .............. 310/201
6,570,280 B2 * 5/2003 Takahashi ..................... 310/71
6,661,134 B2 * 12/2003 Sunaga et al. ................ 310/64
6,707,219 B2 * 3/2004 Matsushita et al. ......... 310/233
6,717,303 B2 * 4/2004 Sakai et al. ............... 310/75 R
6,836,050 B2 * 12/2004 Akabane et al. ............ 310/239
6,916,185 B2 * 7/2005 Hedler et al. ................. 439/83
2003/0178908 A1 * 9/2003 Hirano et al. ............... 310/239

FOREIGN PATENT DOCUMENTS

JP A-2003-284292 10/2003

* cited by examiner

*Primary Examiner*—Thanh Lam
(74) *Attorney, Agent, or Firm*—Posz Law Group, PLC

(57) ABSTRACT

An electric appliance has a first terminal and a second terminal electrically connected to the first terminal. The first terminal has a soldering portion for soldering the second terminal thereon. The soldering portion has a smooth face and a rough face disposed on one imaginary plane. The rough face has a flat portion and a plurality of concavities disposed on the flat portion at intervals. Further, the soldering portion may have a through hole adjacent to the rough face to insert the second terminal. The first terminal is embedded in an insulator. The insulator has an opening exposing the soldering portion therein. The insulator includes a frame forming a housing of an electric appliance. A seal seals a connection gap at a margin of the frame in the housing. A partition wall may be disposed between the soldering portion and the seal.

22 Claims, 7 Drawing Sheets

ELECTRIC APPLIANCE WITH TERMINAL

CROSS REFERENCE TO RELATED APPLICATION

This application is based upon and claims the benefit of priority of Japanese Patent Application No. 2004-131705 filed on Apr. 27, 2004, the content of which is incorporated herein by reference.

FIELD OF THE INVENTION

The present invention relates to an electric appliance with a terminal having a soldering portion for soldering another terminal thereon and a soldering method for the terminal.

BACKGROUND OF THE INVENTION

JP-2003-284292-A discloses a brush holder for a dynamoelectric appliance in which a terminal is soldered. The brush holder has a holder body and a power input connector that are integrally formed. A terminal is embedded over the holder body and the power input connector. One end of the terminal is electrically connected to a circuit board disposed in the holder body by soldering.

Conventionally, a soldering of the terminal includes steps of putting a solder piece on the terminal and radiating a laser light to the solder piece to heat and melt the solder piece. Commonly the terminal has a smooth (burnishing) surface that reflects the laser light to decrease the heating efficiency for melting the solder piece. This extends the time for the soldering.

SUMMARY OF THE INVENTION

The object of the present invention, in view of the above issues, is to provide an electric appliance with terminal having a soldering portion for soldering another terminal thereon and a soldering method for the terminal that can shorten a time for the soldering.

To achieve the above object, an electric appliance has a first terminal and a second terminal electrically connected to the first terminal. The first terminal has a soldering portion for soldering the second terminal thereon. The soldering portion has a smooth face and a rough face disposed on one imaginary plane. The rough face has a flat portion and a plurality of concavities disposed on the flat portion at intervals. Further, the soldering portion may have a through hole adjacent to the rough face to insert the second terminal. The first terminal is embedded in an insulator. The insulator has an opening exposing the soldering portion therein. The insulator includes a frame forming a housing of an electric appliance. A seal seals a connection gap at a margin of the frame in the housing. A partition wall may be disposed between the soldering portion and the seal.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DESCRIPTION OF THE PREFERRED EMBODIMENTS

An embodiment of the present invention will be described with reference to accompanying drawings.

Figure 1:
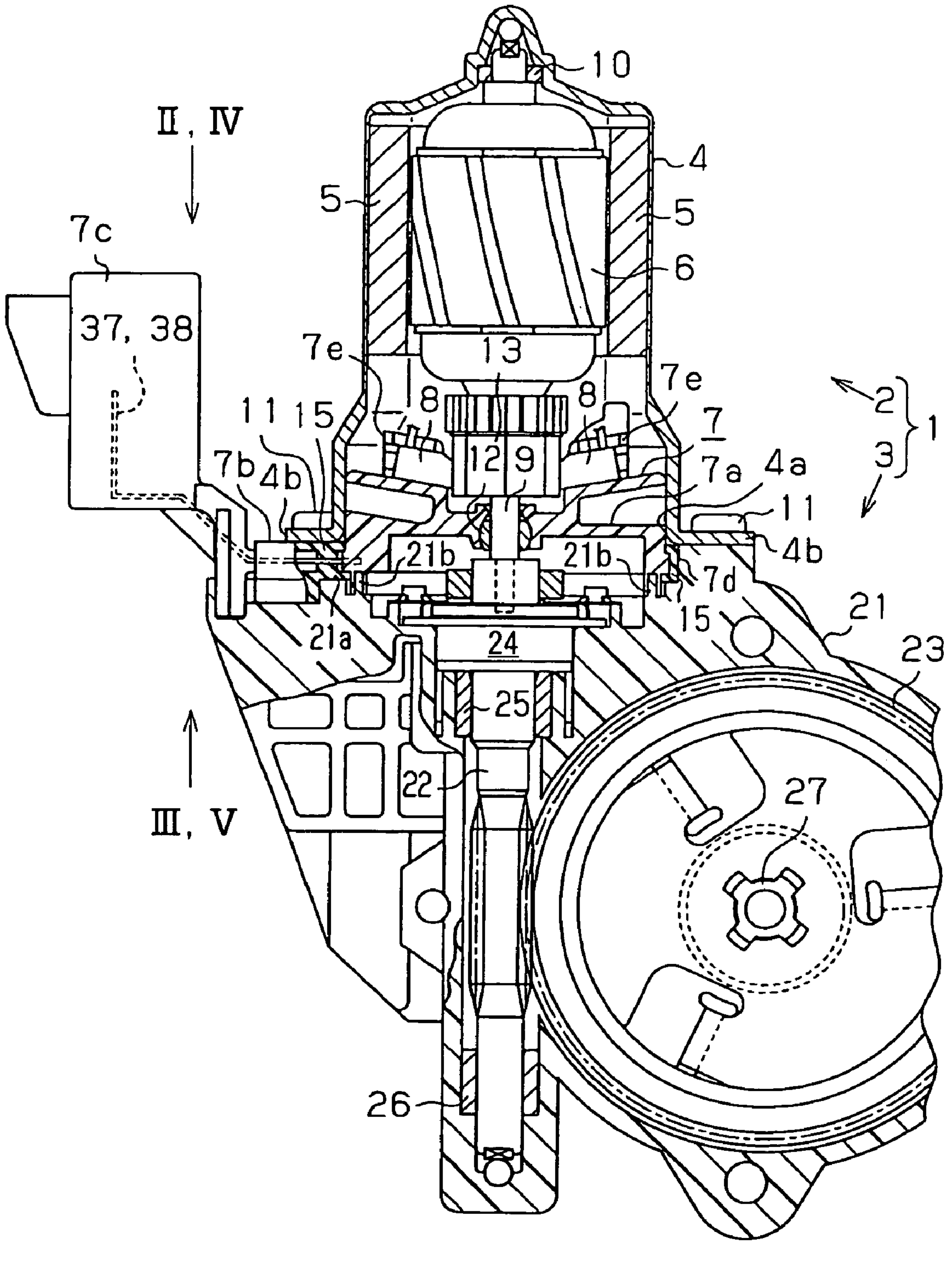
FIG. 1 is a cross-sectional view showing a motor (electric appliance with terminal) according to an embodiment of the present invention.

A motor (a dynamoelectric appliance) 1 shown in FIG. 1 generates a driving power of a power window system mounted on a vehicle. The wiper motor 1 includes a motor unit 2 and a rotation-reducing unit 3.

The motor unit 2 includes a yoke housing 4, a pair of magnets 5, an armature 6, a brush holder 7 and a pair of brushes 8. The yoke housing 4 has a cup shape partially depressed in a radial direction thereof. The plurality of magnets 5 is fixed on an inner peripheral surface of the yoke housing 4. The armature 6 is rotatably enclosed in the yoke housing 4 at a position radially inward of the magnets 5. The yoke housing 4 has a bearing 10 at a center of its bottom. The bearing 10 rotatably holds one end portion of a rotation shaft 9 of the armature 6.

Figure 2:
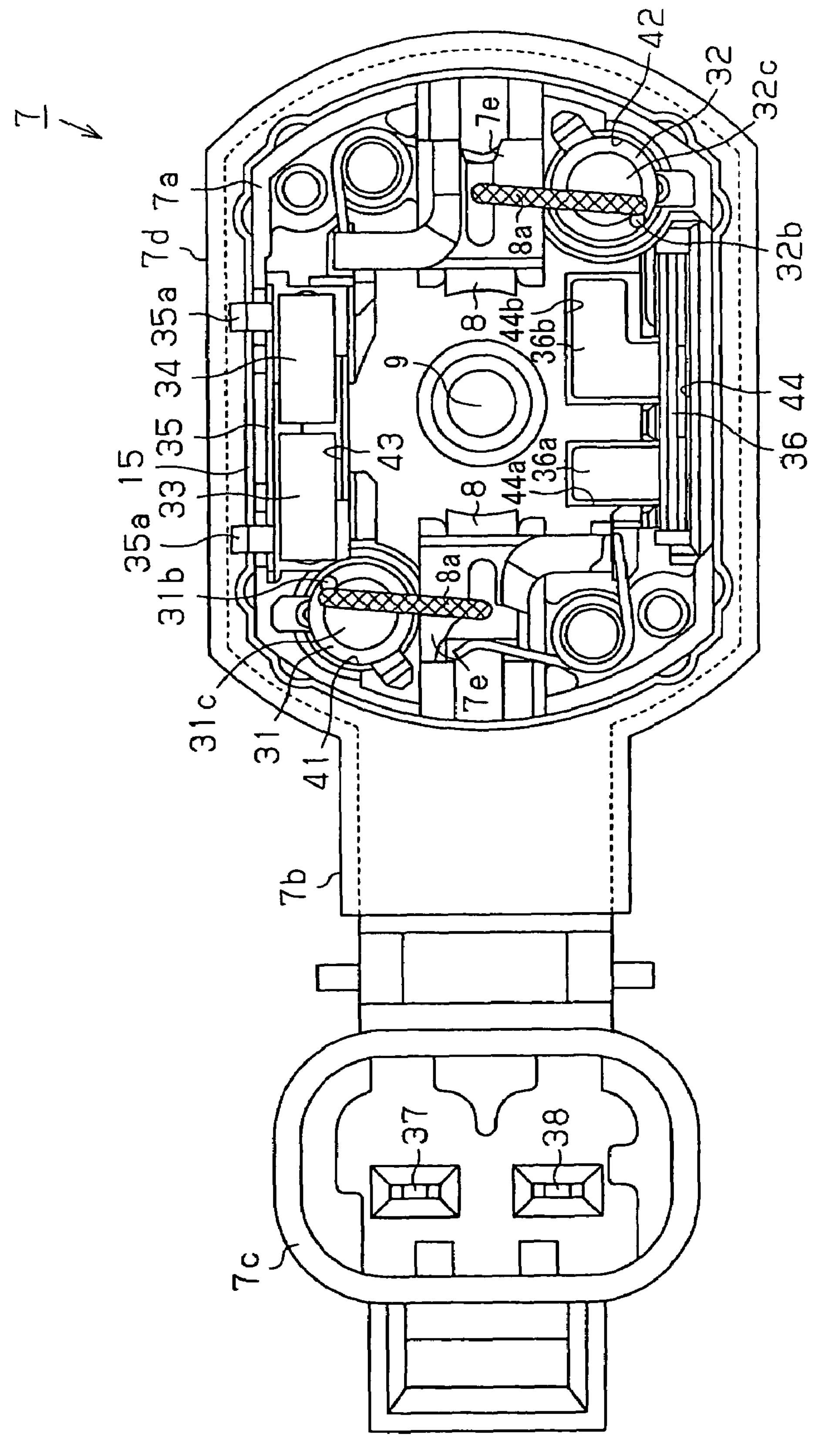
FIG. 2 is a plan view of the brush holder seen in a direction of arrow II in FIG.1.
Figure 3:
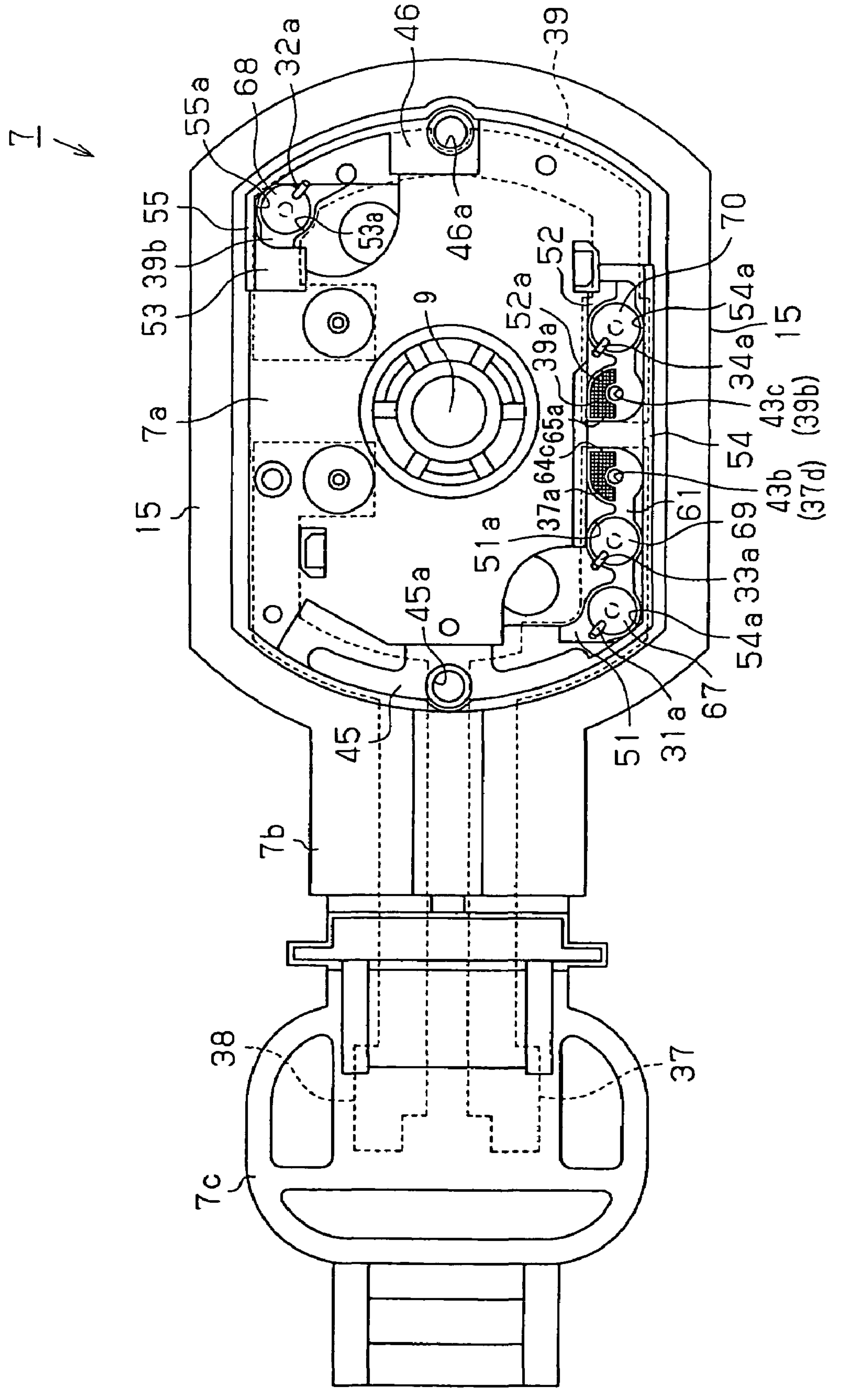
FIG. 3 is a plan view of the brush holder seen in a direction of arrow III in FIG. 1.

An opening 4*a* of the yoke housing 4 has a pair of flanges 4*b* extending outward in a radial direction thereof. A gear housing 21 of the rotation-reducing unit 3 is assembled to the opening 4*a* of the yoke housing 4 by screws 11. As shown in FIGS. 2 and 3, the opening 4*a* (the flanges 4*b*) of the yoke housing 4 and an opening 21*a* of the gear housing 21 interpose the brush holder 7 therebetween.

The brush holder 7 is made of synthetic resin (preferably a thermosetting resin). The brush holder 7 includes a holder body (a frame portion) 7*a* having a circular plate shape, an extension 7*b* extending radially outward from the holder body 7*a* and a connector body (connector portion) 7*c* extending out of the wiper motor 1 to provide an electrical connection with an outer electric appliance.

The holder body 7*a* is provided with a frame mount 7*d* extending over an entire periphery thereof and connected to the extension 7*b*. The opening 4*a* of the yoke housing 4 and the opening 21*a* of the gear housing 21 interpose the frame mount 7*d* and the extension 7*b* therebetween.

The frame mount 7*d* and the extension 7*b* have a seal 15 integrally formed thereon. The seal 15 is made of an elastic and electrically insulating material such as elastomer. The seal 15 covers a surface of the frame mount 7*d* and the extension 7*b* and is interposed between the openings 4*a* and 21*a* of the yoke housing 4 and the gear housing 21. Specifically, the seal 15 seals an interstice between the openings 4*a* and 21*a* to prevent foreign matters such as water drops and dust particles from entering in the yoke housing 4 and the gear housing 21.

A center portion of the holder body 7*a* holds a bearing 12 that rotatably supports another end portion of the rotation shaft 9. The holder body 7*a* further has a pair of brush retainers 7*e* disposed in such a manner of interposing the rotation shaft 9 therebetween. Each the brush retainers 7*e* supports the brushes 8 to be in slide contact with the rectifier 13 integrally rotating with the rotation shaft 9 to supply electric power to the rectifier 13.

Figure 4:
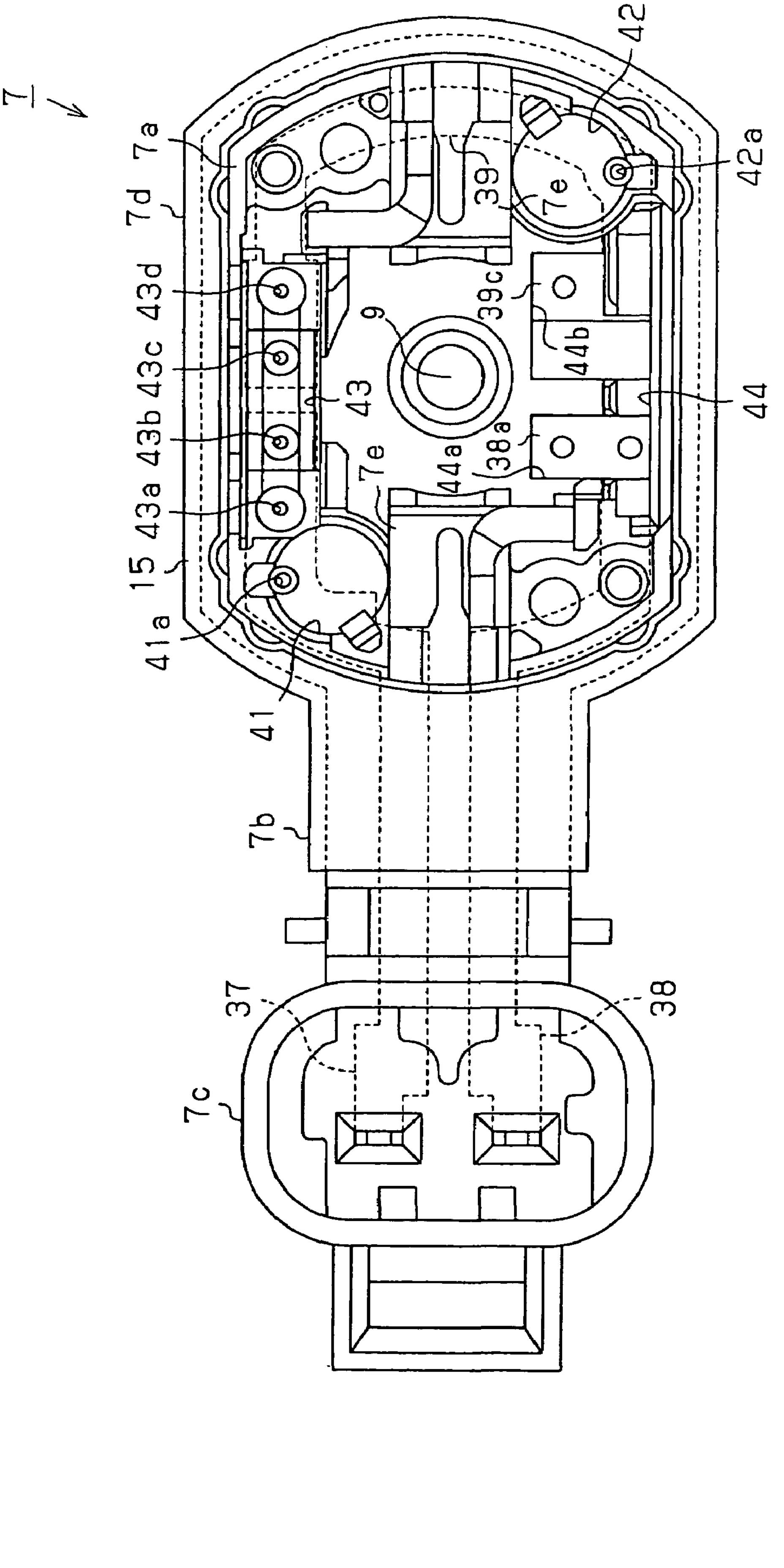
FIG. 4 is a plan view of the brush holder not disposing the electric devices thereon and seen in a direction of arrow IV in FIG. 1.

As shown in FIGS. 2 and 4, the holder body 7*a* has coil-holding hollows 41, 42 at a side of the brush retainers 7*e* (at a side of the motor unit 2). The coil-holding hollows 41, 42 hold cylinder-shaped choke coils 31, 32 to limit a noise in the electric power. The coil-holding hollows 41, 42 are disposed close to the frame mount 7*d* and diagonally on the holder body 7*a* in such a manner of interposing the rotation shaft 9 therebetween. As shown in FIGS. 3 and 4, a bottom of each the coil-holding hollows 41, 42 has through holes 41*a*, 42*a* penetrating the holder body 7*a*. The through holes 41*a*, 42*a* respectively lead one side leads of the choke coils 31, 32 to a side of the rotation-reduction unit 3. Another side leads of the choke coils 31, 32 are connected to pigtails 8*a* extending from the brushes 8.

As shown in FIGS. 2 and 4, the holder body 7*a* has a capacitor-holding hollow 43 at a side of the brush retainers 7*e*. The capacitor-holding hollow 43 holds two rectangular-shaped capacitors 33, 34 side by side. The capacitors 33, 34 also limit a noise in the electric power. The capacitor-holding hollow 43 is disposed close to the coil-holding hollow 41 and close to the frame mount 7*d*. As shown in FIGS. 3 and 4, a bottom of the capacitor-holding hollow 43 has four through holes 43*a*–43*d* in a row. The through holes 43*a*, 43*d*, which are outermost ones in the row, respectively lead one side leads of the capacitors 33, 34 to the side of the rotation-reduction unit 3. Another side leads (not shown) of the choke coils 31, 32 are connected to a grounding terminal 35. The grounding terminal 35 has a pair of protrusions bent to form grounding slips 35*a*. The grounding slips 35*a* protrude out of the frame mount 7*d* to be in contact with the yoke housing 4 through which the grounding terminals are grounded.

As shown in FIGS. 2 and 4, the holder body 7*a* has a breaker-holding hollow 44 at a side of brush retainers 7*e*. The breaker-holding hollow 44 holds a rectangular-shaped circuit breaker 36 for an overcurrent protection. The breaker-holding hollow 44 is disposed at a peripheral portion of the holder body 7*a* and opposite to the capacitor-holding hollow 43 in such a manner that the capacitor-holding hollow 43 and the breaker-holding hollow 44 interpose the rotation shaft 9 therebetween. A bottom of the breaker-holding hollow 44 and a portion close to the bottom thereof have two openings 44*a*, 44*b*. The openings 44*a*, 44*b* are arranged to expose contact portions 38*a*, 39*c* of a second and third terminals 38, 39 that will be described below. The openings 44*a*, 44*b* respectively expose connection leads 36*a*, 36*b* of the circuit breaker 36 to be in contact with the contact portions 38*a*, 39*c* of the second and third terminals 38, 39.

Figure 5:
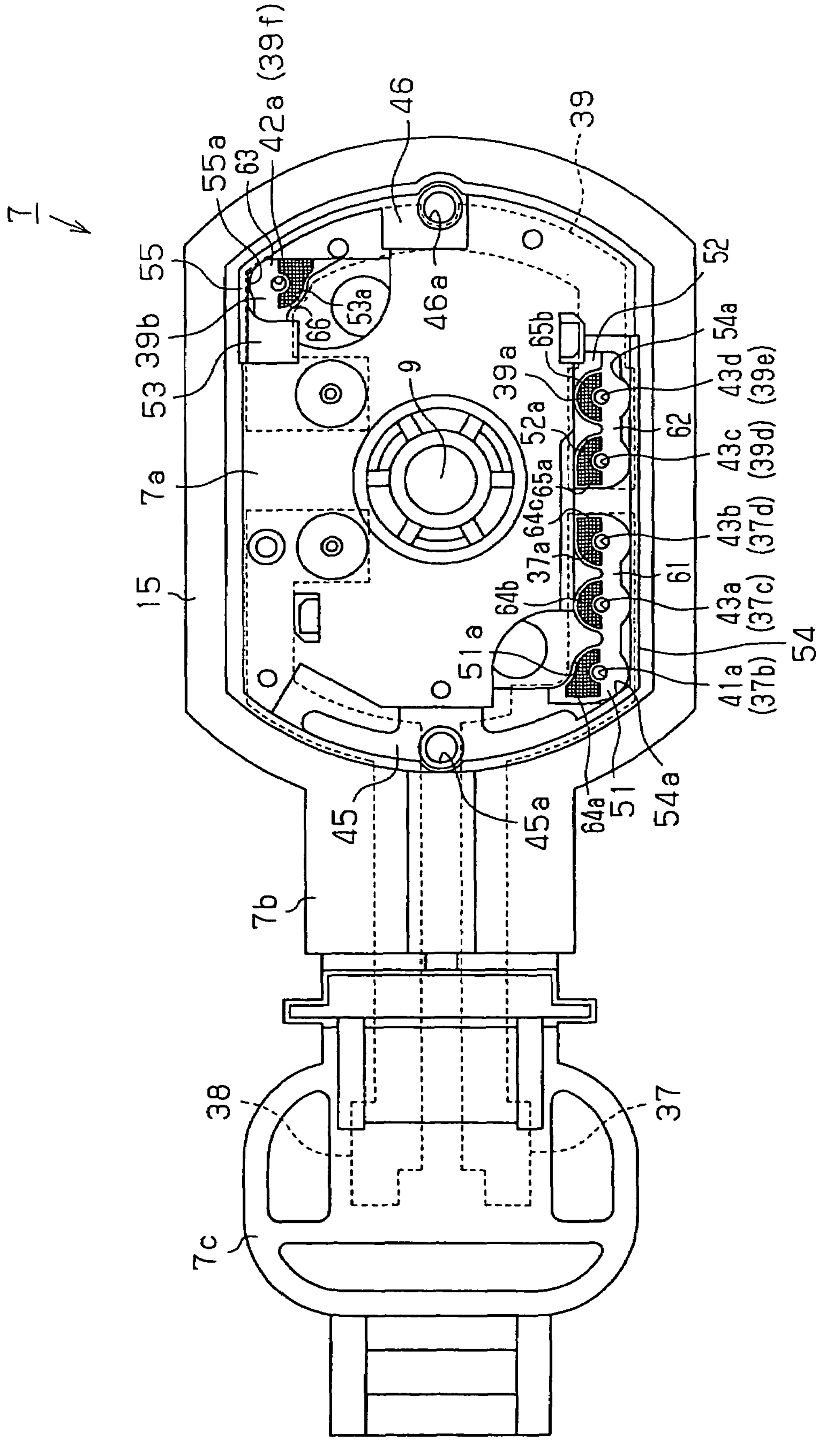
FIG. 5 is a plan view of the brush holder not disposing the electric devices thereon and seen in a direction of arrow V in FIG. 1.

As shown in FIGS. 3 and 5, the holder body 7*a* has fitting projections 45, 46 at the side of the rotation-reduction unit 3. The fitting projections 45, 46 are disposed at both sides in a longitudinal direction of the holder body 7*a* to interpose the rotation shaft 9 therebetween. The fitting projections 45, 46 have flat top faces that are disposed on one imaginary plane. The fitting projections 45, 46 each have fitting holes 45*a*, 46*a* opening on the top faces and extending in parallel with the rotation shaft 9. The fitting holes 45*a*, 46*a* are on a line that extends in a longitudinal direction of the holder body 7*a* and crosses with the center of the rotation shaft 9. The fitting holes 45*a*, 46*a* are for inserting fitting projections 21*b* of the gear housing 21 (refer to FIG. 1). The fitting projections 21*b* also extend in parallel with the rotation shaft 9. The engagement of the fitting holes 45*a*, 46*a* and the fitting projections 21*b* restricts deviation of the brush holder 7 and the gear housing 21 from each other.

As shown in FIGS. 3, 5, 6A and 6B, the holder body 7*a* has a first to third connection faces 51–53 at respective portions close to the fitting projections 45, 46. The first connection face 51 is at a rear of the coil-holding hollow 41 and the capacitor-holding hollow 43. The second connection face 52 is at the rear of the capacitor-holding hollow 43 and at a side of the first connection face 51. The third connection face 53 is at a rear side of the coil-holding hollow 42. The first connection face 51 has an opening 51*a* communicated with the through hole 41*a* of the coil-holding hollow 41 and the through holes 43*a*, 43*b* of the capacitor-holding hollow 43. The second connection face 52 has an opening 52*a* communicated with the through holes 43*c*, 43*d* of the capacitor-holding hollow 43. The third connection face 53 has an opening 53*a* communicated with the through hole 42*a* of the coil-holding hollow 42.

Figure 6A:
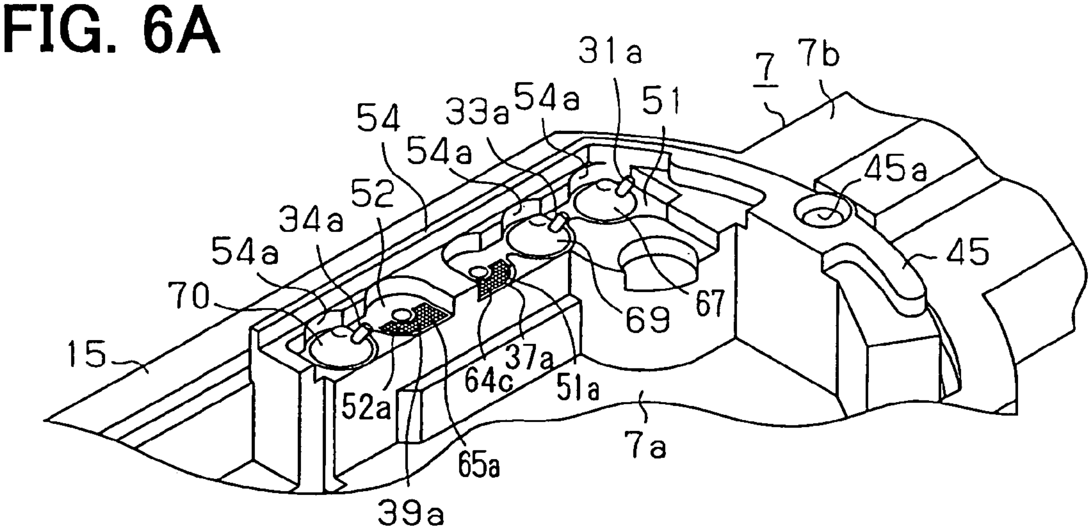
FIG. 6A is a perspective view showing a connecting portion.
Figure 6B:
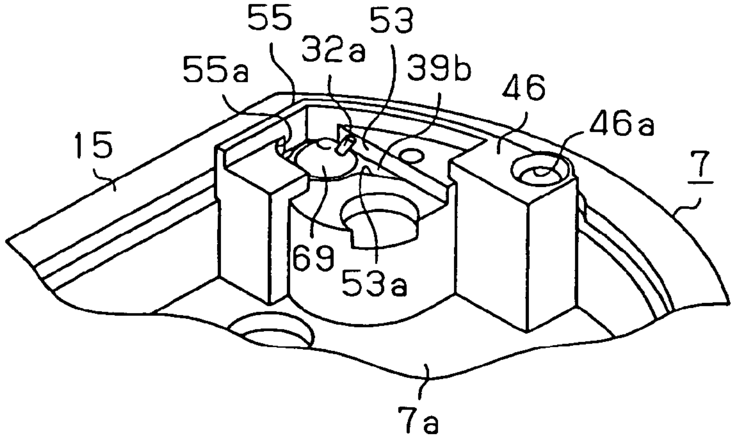
FIG. 6B is a perspective view showing the connecting portion.

As shown in FIG. 6A, the holder body 7*a* has a wall portion 54 extending along the peripheral portion thereof, specifically at a boundary between the first and second connection faces 51, 52 and the seal 15. The wall portion 54 is integrally formed with the holder body 7*a*. The wall portion 54 protrudes beyond the connection faces 51, 52 and the seal 15. Specifically, top faces of the wall portion 54 and the fitting projection 45 are on one imaginary plane. The wall portion 54 continuously extends from the fitting projection 45 to the boundary at a side of the first and second connection faces 51, 52. As shown in FIG. 6B, the holder body 7*a* also has a wall portion 55 extending along the peripheral portion thereof, specifically at a boundary between the third connection face 53 and the seal 15. The wall portion 55 is also integrally formed with the holder body 7*a*. The wall portion 55 protrudes beyond the connection face 53 and the seal 15. Specifically, top faces of the wall portion 55 and the fitting projection 46 are on one imaginary plane. The wall portion 55 continuously extends from the fitting projection 46 to the boundary at a side of the third connection face 53.

As shown in FIGS. 2–5, a first terminal 37 and the second terminal 38 are embedded in the holder body 7*a*, the extension 7*b* and the connector body 7*c* of the brush holder 7 by insert molding. The first and second terminals 37, 38 each extend from the connector body 7*c* through the extension 7*b* to respective portions of the holder body 7*a*. The first and second terminals 37, 38 are disposed side by side in the connector body 7*c* and the extension 7*b*, and in a separate arrangement in the holder body 7*a*. The third terminal 39 is embedded in the holder body 7*a* by insert molding. The first, second and third terminals 37–39 each are made of metal plate.

The connector body 7*c* exposes one end of the first terminal 37 and the opening 51*a* of the first connection face 51 exposes another end of the first terminal 37 to provide a contact portion 37*a*. The connector body 7*c* also exposes one end of the second terminal 38 and the opening 44*a* in the breaker-holding hollow 44 exposes another end of the second terminal 37 to provide the contact portion 38*a*. The opening 52*a* of the second connection face 52 exposes one end of the third terminal 39 to provide a contact portion 39*a*. The opening 53*a* of the third terminal 53 and the opening 44*b* of the breaker-holding hollow 44*b* expose another end of the third terminal 39 to provide contact portions 39*b*, 39*c*. The contact portion 37*a* of the first terminal 37 has insert holes 37*b*–37*d* in communication with the through hole 41*a*, 43*a*, 43*b* at corresponding positions. The contact portion 39*a* of the third terminal 39 has insert holes 39*d*, 39*e* in communication with the through holes 43*c*, 43*d* at corresponding positions. The contact portion 39*b* of the third terminal 39 has an insert hole 39*f* in communication with the through hole 42*a* at a corresponding position. As shown in FIGS. 6A and 6B, the surfaces of the contact portions 37*a*, 39*a*, 39*b* exposing the openings 51*a*–53*a* and the sealing surface of the seal 15 are on one imaginary plane. Namely, the surfaces of the contact portions 37*a*, 39*a*, 39*b* are retracted relative to the wall portions 54 and 55.

As shown in FIG. 5, the contact portion 37*a* has a smooth face 61 and rough faces 64*a*–64*c* formed continuously with each other. The contact portion 39*a* has a smooth face 62 and rough faces 65*a*–65*b* formed continuously with each other. The contact portion 39*b* has a smooth face 63 and rough faces, or matte faces, 66 formed continuously with each other. Specifically, the rough faces 64*a*–64*c* each are adjacent to the through holes 37*b*–37*d*, the rough faces 65*a*, 65*b* each are adjacent to the through holes 39*d*, 39*e* and the rough face 66 is adjacent to the through bole 39*f*.

Figure 7A:
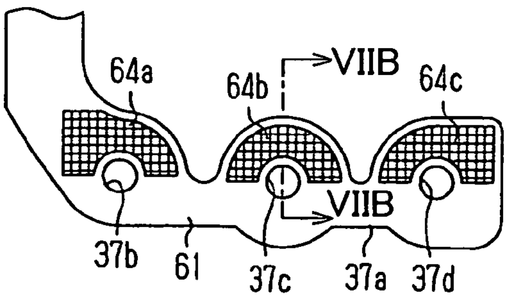
FIG. 7A is a plan view showing the connecting portion.
Figure 7B:
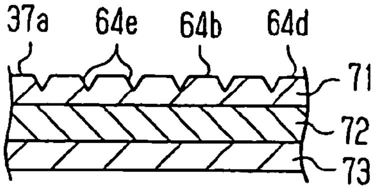
FIG. 7B is a cross sectional view taken along a line VIIB—VIIB in FIG. 7A.

The rough face 64*a*–64*c* on the contact portion 37*a* will now be described in the following. As shown in FIG. 7A, the rough face 64*a*–64*c* are defined in an approximately semi-circular (arc) shape that are close to the through holes 37*b*–37*d* to surround half circumferences thereof. The rough faces 64*a*–64*c* are disposed at radially inner positions relative to the through holes 37*b*–37*d* in the radial direction of the holder body 7*a*. The arrangement of the rough faces 64*a*–64*c* is adjusted to a radiation direction of laser lights in a soldering process of the contact portion 37*a* as described below (refer to FIG. 10). As shown in FIG. 7B, the rough face 64*b* has a flat face 64*d* continuous to the smooth face 61 and a plurality of dents (concavities) 64*e* formed on the flat face 64*d*. The contact portion 37*a* has a stack of a plating layer 71, a core plate 72 and a plating layer 73 from one surface to another one. Each of the above-described grooves 64*e* has a depth making the dents 64*e* not reaching the core plate 72.

Figure 8A:
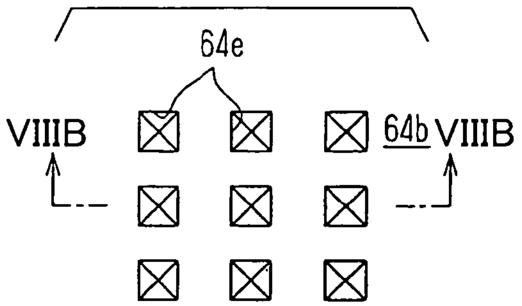
FIG. 8A is a plan view showing the rough face.
Figure 8B:
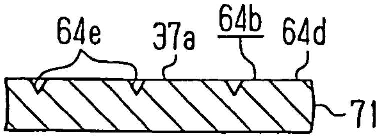
FIG. 8B is a cross sectional view taken along a line VIIIB—VIIIB in FIG. 8A.

As shown in FIGS. 8A, 8B, each of the dents 64*e* are a quadrangular pyramid-shaped that are formed in stamping the terminal 37 with a stamping die (not shown). Desirably, the dents 64*e* are disposed at a small interval (at 0.2 mm for example). The rough faces 64*a*, 64*c* on the contact portion 37*a* and the rough faces 65*a*, 65*b*, 66 on the contact portions 39*a*, 39*b* are formed similarly as the rough face 64*b* on the contact portion 37*a*.

The terminals 37–39 are in electric connection to the circuit breaker 36, the choke coils 31, 32 and the capacitors 33, 34 as follows. The circuit breaker 36 is connected by electric soldering to the contact portions 37*a*, 39*a* of the second and third terminal 38, 39 exposed at the openings 44*a*, 44*b*. One side leads 31*a*, 32*a* of the choke coils 31, 32 are introduced in the through holes 37*b*, 39*f* of the first and third terminal 37, 39 exposed in the openings 51*a*, 53*a* and connected by solder 67, 68 to the contact portions 37*a*, 39*b*. In this embodiment, the above-described electric connections, namely soldering, are processed after assembling the seal 15 relative to the brush holder 7.

Figure 9:
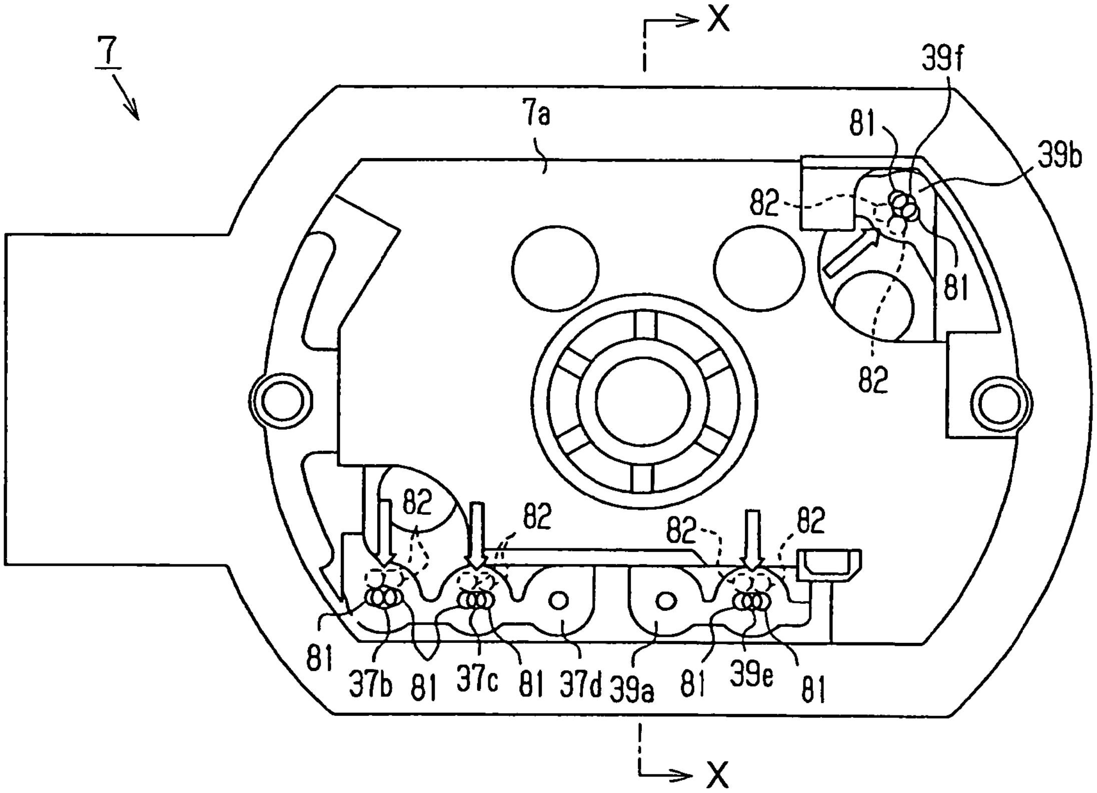
FIG. 9 is a plan view showing a soldering process.
Figure 10:
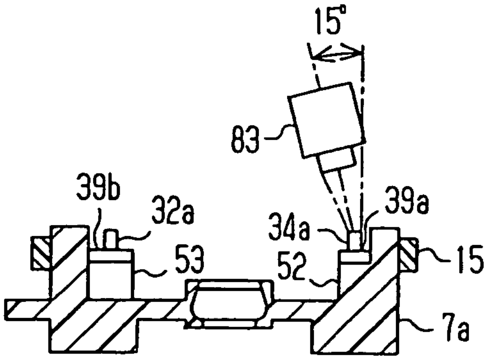
FIG. 10 is a cross-sectional view taken along a line X—X for explaining the soldering process.

As shown in FIG. 9, the above-described soldering is processed by a laser-processing machine. Specifically, solder wires are fed to the through holes 37*b*, 37*c*, 39*e*, 39*f* on contact portions 37*a*, 39*a*, 39*b* outward in a radial direction of the holder body 7*a*, which is shown by arrows in the figure and will be referred to as "feeding direction" below. The laser-processing machine radiates laser lights in the feeding direction to melt the solder wire. As shown in FIG. 10, the a processing head 83 of the laser-processing machine radiates the laser lights to the contact portion 37*a* (39*a*, 39*b*) at an angle that is inclined by approximately 15 degrees relative to an normal direction of the contact portion 37*a* (39*a*, 39*b*). As shown in FIG. 9, the processing head 83 radiates the laser lights in the feeding direction on radiation areas 81 adjacent to the through holes 37*b*, 37*c*, 39*e*, 39*f* to heat them. The radiation areas 81 are defined at positions at both sides of the through holes 37*b*, 37*c*, 39*e*, 39*f* in a direction perpendicular to the feeding direction. Thus, the temperature increases of the radiation areas 81 are prominent at the rough faces 64*a*, 64*b*, 65*b*, 66. Further, temperatures of preheating areas 82 located short of the radiation areas 81 in the feeding direction also increase.

The rough faces 64*a*, 64*b*, 65*b*, 66 has an irregular surface realized by the plurality of dents 64*e* to be subjected to the laser lights and to be heated efficiently. This is because the laser lights enter on the surface of the rough faces 64*a*, 64*b*, 65*b*, 66 at varied angles to restrict heat generated by the laser lights from radiating outward. Thus, the heating efficiency by the laser lights is larger relative to smooth faces 61–63. Further, the rough faces 64*a*, 64*b*, 65*b*, 66 are subjected to laser radiation at larger area are than they were made flat. Accordingly, the solder wires melt in a short time are efficiently heated on the rough faces 64*a*, 64*b*, 65*b*, 66 and spread onto the smooth faces 61–63 continued to the rough faces 64*a*, 64*b*, 65*b*, 66 to form the solder 67–70 in a short time.

Conventional soldering is processed with flux to clean the contacts, to restrict the oxidation, to improve the soldering state by decreasing surface tension of the melt solder. In this embodiment, the flux is contained in the solder wire, or the solder 67–70. The flux and the solder melt by the heat in soldering process sometimes spread and/or splatter over designed areas. In this embodiment, the contact portions 37*a*, 39*a* are surrounded by the wall portion 54 and the contact portion 39*b* is surrounded by the wall portion 55 to prevent the flux and solder from spreading and/or flattering to the periphery of the holder body 7*a*, namely the seal 15. Thus, the wall portions 54, 55 prevent solder and flux with high temperature from adhering on the seal 15 not to deform the seal 15 and to secure a sealing quality between the opening 4*a* of the yoke housing 4 and the opening 21 a of the gear housing 21.

As shown in FIGS. 6A and 6B, the wall portions 54, 55 have curved side faces 54*a*, 55*a* along peripheries of soldering areas on which the solders 67–70 are soldered. The curved side faces 54*a*, 54*b* have radiuses approximately equal to those of the soldering areas. The curved side faces 54*a*, 55*a* do not restrict for the solder 67–70 spreading on the soldering areas to form a conical shape suitable for securing a good electric contact. Even when the solder 67–70 spreading on the soldering areas come in contact with the curved side faces 54*a*, 55*a*, the curved side faces 54*a*, 55*a* do not hinder the solder 67–70 from forming the conical shape.

The rotation-reduction unit 3 has a gear housing 21, a worm axis 22, a worm wheel 23 and a clutch 24. The gear housing 21 is made of a synthetic resin and has a shape for enclosing the worm axis 22, the worm wheel 23 and the clutch 24 therein. The gear housing 21 has the opening 21*a* to be faced with the opening 4*a* (flange portion 7*b*) of the yoke housing 4. The gear housing 21 and the yoke housing 4 interpose the brush holder 7 therebetween and are fixed to each other with the bolts 11.

The worm axis 22 is rotatably supported by a pair of bearings 25, 26 provided in a given position in the gear housing 21, and is engaged via the clutch 24 with the rotation shaft 9. The clutch 24 transmits a driving force of the rotation shaft 9 to the worm axis 22 and prevents the rotational force of the worm axis 24 from transmitting to the rotation shaft 9 by locking the rotation of the worm axis 24. That is, the clutch 24 prevents an outer force acting on an output axis 27 from rotating the motor 1.

The worm axis 22 is engaged with the worm wheel 23. The worm wheel 23 is in driving connection with the output axis 27 disposed perpendicular to the worm axis 22. The output axis 27 is in driving connection with a conventional X-armed type regulator for opening and closing the power windows. Thus, the rotation of the output axis 27 operates the regulator to open and close the power windows.

The present embodiment has the following advantages.

(a) The contact portions 37*a*, 39*a*, 39*b* subjected to the laser lights has a larger efficiency at rough faces 64–66 in absorbing heat generated by the laser lights to melt the solder wire in a short time. Further, the rough face 64–66 formed continuously to the smooth faces 61–63 helps the solder melt on the rough faces 64–66 to spreads to the smooth faces 61–63. That is, the soldering on the contact portions 37*a*, 39*a*, 39*b* can be processed in a short time.

(b) The rough face 64*a* is formed with a flat face 64*d* continuously formed to the smooth face 61 and a plurality of dents 64*e* formed on the flat face 64*d*. Thus, the rough face 64*a* is easily manufactured by stamping the flat face 64*d* continuous to the smooth face 61.

(c) The terminals 37–39 have through holes 37*b*–37*d*, 39*d*–39*f* for introducing one leads 31*a*–34*a* of the choke coils 31, 32 and the capacitors 33, 34. The rough faces 64*a*–64*c*, 65*a*, 65*b*, 66 are disposed close to the through holes 37*b*–37*d*, 39*d*–39*f* of the contact portions 37*a*, 39*a*, 39*b*. Thus, it is possible to heat positions close to the through holes 37*b*–37*d*, 39*d* –39*f* of the contact portions 37*a*, 39*a*, 39*b* efficiently by the laser lights to solder the leads 31*a*–34*a* of the electric devices 31–34 introduced in the through holes 37*b*–37*d*, 39*d*–39*f* in a short time and securely.

(d) The contact portions 37*a*, 39*a*, 39*b* are surrounded by wall portions 54, 55 that protrude beyond the contact portions 37*a*, 39*a*, 39*b*. Thus, the wall portions 54, 55 restrict solder wire melt on the contact portions 37*a*, 39*a*, 39*b* from spreading over the contact portions 37*a*, 39*a*, 39*b*.

(e) In soldering on the contact portions 37*a*, 39*a*, 39*b*, laser lights are intensively radiated on the rough faces 64*a*–64*c*, 65*a*, 65*c*, 66 (the radiation areas shown in FIG. 9) having a large efficiency in absorbing heat generated by the laser lights. This assembly helps the solder to be melted fast.

(Modified Embodiments)

The above embodiments can be modified as follows, for example.

(1) The terminals 37–39 embedded in the brush holder 7 in the embodiment may be separately formed and assembled in the terminals 37–39.

(2) The dents 64*e* having a quadrangular pyramid shape in the embodiment. The shapes of the dents, however, are not limited to the quadrangular pyramid-shape. For example, the dents may have a groove shape formed on a flat face.

(3) The above-described embodiment is applied to a motor 1 for the power window system. The present invention, however, can also be applied to motors for other apparatus such as a wiper motor for a windshield wiper system.

(4) The above-described embodiment is applied to a motor 1 having a motor unit 2 and a rotation-reduction unit 3 in a body. The present invention, however, can also be applied to a motor without any rotation-reduction unit (deceleration mechanism) therein.

The present invention further has the following advantages.

(f) The dents 64*e* are easily formed by stamping than forming protrudes. This decreases the manufacturing cost of the brush holder 7.

(g) The dents 64*e* having a quadrangular pyramid shapes can be formed at a large density in an area, because it is easy to provide the stamping form with quadrangular pyramid-shaped projections.

(h) The manufacturing cost of the brush holder 7 by integrally forming the wall portions 54, 55 with the holder body 7*a* by injection molding.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electric appliance comprising a first terminal and a second terminal electrically connected to the first terminal, wherein:

the first terminal has a soldering portion for soldering the second terminal thereon;

the soldering portion has a smooth face and a rough face, wherein the rough face includes a pattern of indentations for receiving laser light and for creating a relatively large surface area for receiving the laser light, compared to the smooth face, wherein the rough face is adapted to heat with greater efficiency when exposed to laser light than the smooth face, for melting solder;

the soldering portion is provided with a through hole therein for inserting the second terminal; and the rough face is adjacent to the through hole; and the smooth face and the rough face are separate from one another and generally coplanar.

2. The electric appliance according to claim 1, wherein: the rough face has a flat portion and a plurality of dents disposed on the flat portion at intervals.

3. The electric appliance according to claim 2, wherein each of the dents has a generally quadrangular pyramid shape.

4. The electric appliance according to claim 2, wherein: the soldering portion includes a core plate and a plating layer coated on the core plate; and the each of the dents is formed in the plating layer.

5. The electric appliance according to claim 4, wherein the concavity has a depth shorter than a thickness of the plating layer.

6. The electric appliance according to claim 1, wherein the rough face is formed along at least a portion of a circumference of the through hole.

7. The electric appliance according to claim 1, further comprising an insulator for enclosing the first terminal therein, the insulator having an opening exposing the soldering portion therein.

8. The electric appliance according to claim 7, wherein the insulator is a thermosetting resin.

9. The electric appliance according to claim 7, wherein the first terminal is embedded in the insulator by an insert molding.

10. The electric appliance according to claim 7, further comprising a partition wall disposed along at least a portion of a periphery of the soldering portion and protruding beyond the soldering portion.

11. The electric appliance according to claim 7, further comprising a frame portion forming a portion of a housing of the electric appliance.

12. The electric appliance according to claim 11, further comprising a connector portion protruding out of the frame portion and for an electrical connection of the electric appliance to an outer appliance, wherein: each of the frame portion and the connector portion are the insulator; and the first terminal extends from the frame portion to the connector portion for the electrical connection.

13. The electric appliance according to claim 7, further comprising: a partition wall disposed along at least a portion of a periphery of the soldering portion and protruding beyond the soldering portion; a frame portion forming a portion of a housing of the electric appliance; and a seal disposed at a circumference of the frame portion and sealing a connection gap at a margin of the frame portion in the housing, wherein the partition wall is disposed between the soldering portion and the seal.

14. The electric appliance according to claim 13, wherein: the frame portion has an engaging projection to fit the frame portion in a predetermined orientation in the housing, and the partition wall and the engaging projection have top faces generally disposed on one imaginary plane.

15. The electric appliance according to claim 13, wherein: the rough face is disposed at a counter side to the seal in the soldering portion.

16. The electric appliance according to claim 13, wherein: the electric appliance is a dynamoelectric appliance; and the frame portion is a brush holder supporting a brush of the dynamoelectric appliance.

17. The electric appliance according to claim 16, wherein the second terminal is a lead of any one of a choke coil, a capacitor and a circuit breaker.

18. The electric appliance according to claim 2, wherein the plurality of dents are disposed at intervals of 0.2 mm.

19. The electric appliance according to claim 2, wherein the plurality of dents are arranged in a two-dimensional array.

20. The electric appliance according to claim 3, wherein a bottom vertex angle of the generally quadrangular pyramid shape is 45 degrees or smaller.

21. The electric appliance according to claim 6, wherein the through hole is located between the smooth face and the rough face.

22. The electric appliance according to claim 6, wherein the through hole penetrates the soldering portion.

* * * * *